J. H. CAMPBELL.
HORSE FOR GLASS CYLINDERS.
APPLICATION FILED JAN. 7, 1919.
1,312,306.
Patented Aug. 5, 1919.
2 SHEETS—SHEET 2.
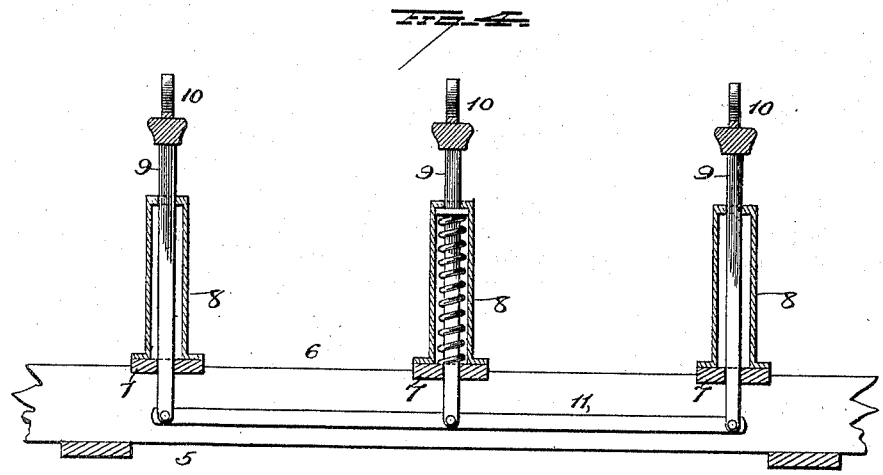
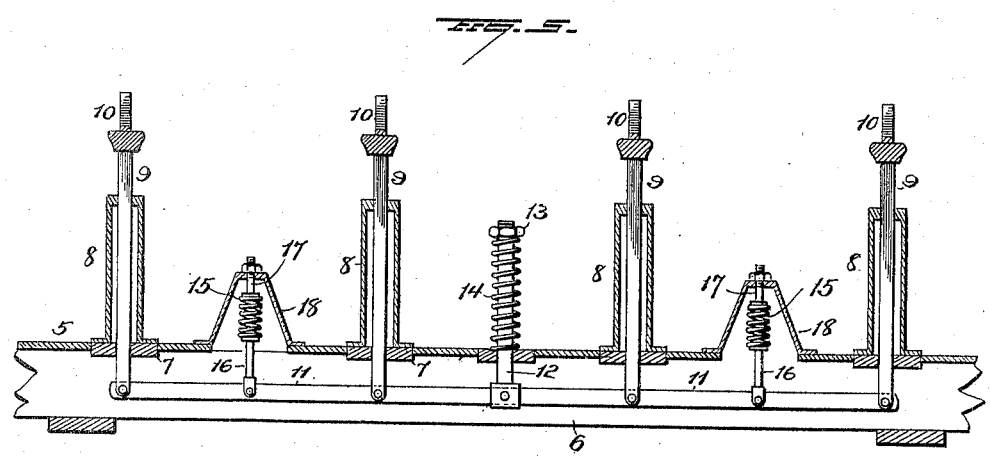

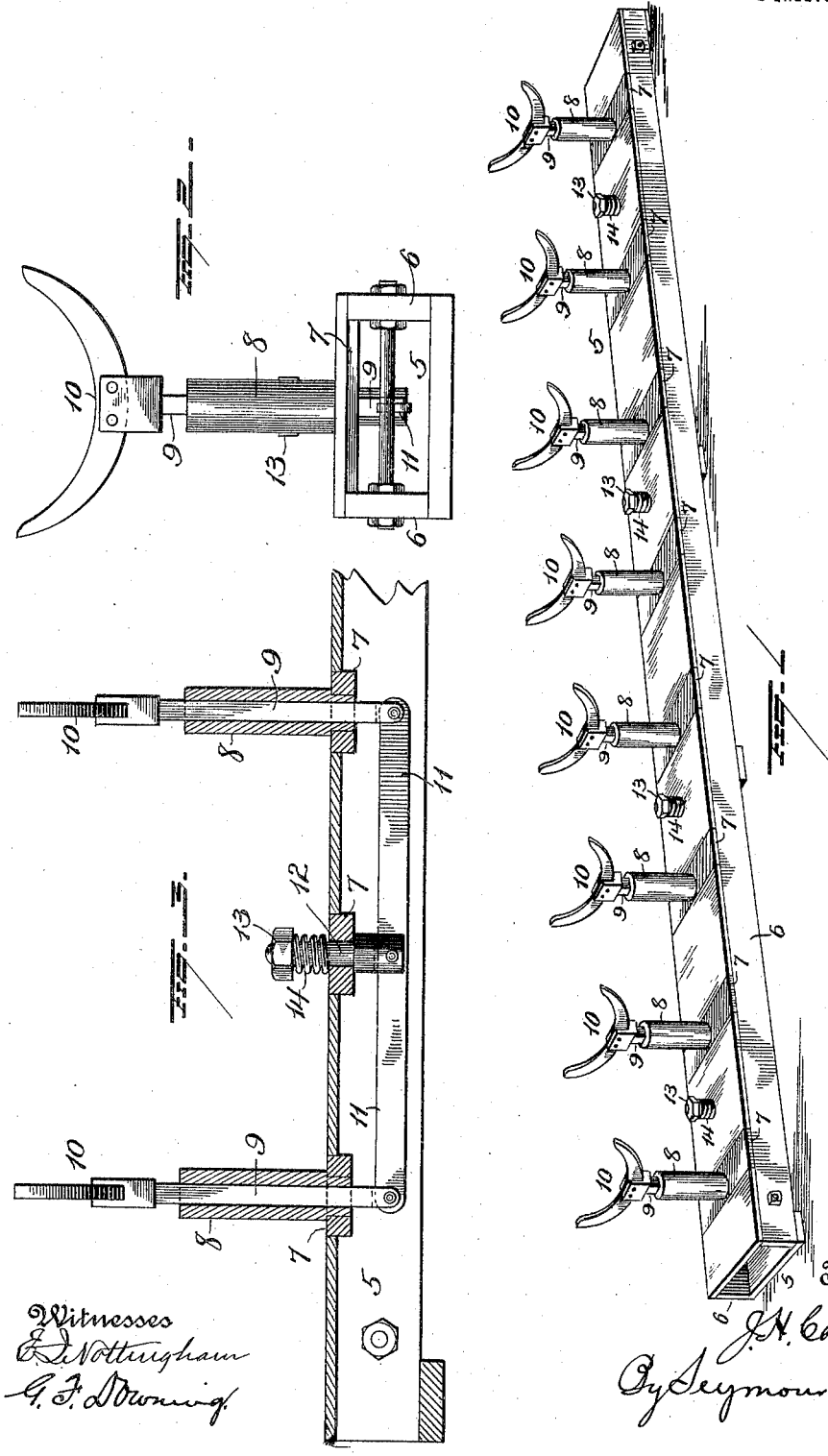

UNITED STATES PATENT OFFICE.

JAMES H. CAMPBELL, OF LANCASTER, OHIO, ASSIGNOR TO THE COLUMBUS GLASS COMPANY, OF LANCASTER, OHIO.

HORSE FOR GLASS CYLINDERS.

1,312,306.  Specification of Letters Patent.  Patented Aug. 5, 1919.

Application filed January 7, 1919. Serial No. 270,023.

*To all whom it may concern:*

Be it known that I, JAMES H. CAMPBELL, a citizen of the United States, and a resident of Lancaster, in the county of Fairfield and State of Ohio, have invented certain new and useful Improvements in Horses for Glass Cylinders; and I do hereby declare the following to be a full, clear, and exact description of the invention, such as will enable others skilled in the art to which it appertains to make and use the same.

My invention relates to an improvement in horses used in window glass factories for supporting the glass cylinders after they have been taken down, and while they are being cut into smaller cylinders.

With the horses now universally used, each saddle or cylinder carrying member of the horse is supported on a spring and each is independent of all others, hence if one spring is slightly stiffer than the other by reason of its construction or adjustment, it will bear a greater proportion of the weight of the cylinder than a saddle supported by a weaker spring, and the cylinder will be unevenly supported throughout its length and insufficiently suppported at points.

The object of the invention is to provide connections between the supporting members of the horse whereby a pressure or weight on one member will be transmitted to another or others and thus cause them to adjust themselves to the surface of the cylinder and evenly support the latter throughout its length irrespective of differences in diameter, so that the weight of the cylinder will be evenly distributed on the supporting member of the horse.

With these objects in view my invention consists in the parts and combinations of parts and in the details of construction as will be more fully described and pointed out in the claims.

In the accompanying drawings, Figure 1 is a view in perspective of my improvement; Fig. 2 is a view in end elevation; Fig. 3 is a view in vertical longitudinal section and Figs. 4 and 5 similar views of modified forms.

5 represents a base preferably composed of side members 6 connected at the top by the plates 7. If desired the spaces between the connecting plates may be left open, but I prefer to close in the entire top for the better protection of the parts within the base. Secured to some of the connecting plates are the upwardly projecting hollow standards 8, which are open throughout their entire length for the reception and passage of the shanks 9 of the saddle or cylinder supporting members 10, the bore of the standards being preferably angular in cross section so that the shanks of the saddle, which conform to the shape of the horse, will be held from turning and thus hold all the saddles in proper position to receive a glass cylinder from the take down apparatus. The shanks 9 of the saddles pass through the standards and connecting plates 7, and terminate below the latter and within the base, the fit between the shanks and the parts through which the latter pass being sufficiently loose to permit of free vertical movement of the shanks and the saddles carried thereby.

I prefer to employ an even number of saddles, and the lower ends of the shanks of each adjacent two are connected by the beam 11, the latter being pivotally connected at its ends to the lower ends of the shanks. Each beam is pivotally connected at its center to the lower end of the depending post 12, which passes upwardly through a connecting plate 7 and is provided at its upper end with a nut 13 or equivalent device which rests on the spring 14, the latter embracing the post between the said connecting plate and nut and forming a yielding seat for the nut.

The shanks of the several saddles project sufficiently below the connecting plate to permit of the necessary movements of the saddles, and the arrangement is such that when one saddle is depressed the other will rise to meet the cylinder, and when the glass cylinder is deposited thereon it will be equally supported by each of the two connected saddles and the entire weight borne by the springs, the arrangement being such that the saddles will accommodate themselves to the cylinder irrespective of variations in the size of the latter.

If in taking down the cylinder it engages one saddle before the other, the engaged saddle will descend and the other rise to meet the cylinder until the latter is resting on both saddles, after which the weight is transmitted to the spring which then sustains the cylinder. If on the other hand both saddles be engaged at the same instant, both saddles and the beam connecting the same will descend at once thus compressing the spring, which cushions the movement of the beam and both saddles. With this arrangement the cylinder is not only yieldingly supported, but the yielding supports are so connected that each sustains approximately the same load thus minimizing the danger of breakage prior to severing the cylinder into lengths.

In Fig. 4 I have coupled the saddles up in series of three instead of two, and connected the beam to the shank of the middle or intermediate saddle. With this arrangement, any depression of either end of the beam connecting the saddles will cause a corresponding downward movement of the intermediate standard and its saddle, so that when the cylinder has been finally deposited on the horse all the saddles of each connected series will sustain approximately its share of the load.

In Fig. 5 I have shown four saddles carried by a single rocking beam. With this construction the beam is supported centrally on a post 12 passing upwardly through a connecting plate and supported on a spring 14, the tension of the spring 14 being regulated by the nut 13. The rocking beam is also connected between each pair of saddles, by the helical springs 15, the latter being connected at their lower ends to the rods 16 having pivotal connection with the rocking beam, and at their upper ends with the rods 17 which pass through the housings 18 and supported on the nuts 19 resting on the housings, and by which the tension of springs 15 are regulated and controlled.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a horse for glass cylinders, the combination of two saddles, each having a depending shank, supporting means for the shanks, and a beam pivoted intermediate its ends and connected adjacent its ends with the shanks of the saddles whereby a movement of one saddle will be imparted to the other.

2. In a horse for glass cylinders, the combination of two saddles each having a depending shank, supporting means for the shanks, a beam pivotally connected at its ends to the shanks of the saddles and a yielding fulcrum for the beam.

3. In a horse for glass cylinders, the combination of two standards, a saddle for each standard, each saddle having a shank passing through its standard and free to move vertically therein, a rocking beam connecting the two shanks at their lower ends and a yielding fulcrum for the beam.

4. In a horse for glass cylinders, the combination of two standards, a saddle for each, each saddle having a shank passing through its standard and free to move vertically therein, a rocking beam connecting the two shanks at their lower ends, a fulcrum for the beam and a spring seat for the said fulcrum.

5. In a horse for glass cylinders, the combination of two standards, a saddle for each, each saddle having a shank passing through its standard and free to move vertically thereon, a rocking beam connecting the two shanks at their lower ends, a third saddle and its shank the latter forming the fulcrum for the rocking beam, and a spring supporting the shank of said third saddle.

In testimony whereof, I have signed this specification in the presence of two subscribing witnesses.

JAMES H. CAMPBELL.

Witnesses:
A. M. FLOWERS,
THOS. S. CUNNINGHAM.